United States Patent
Morishita

[19]
[11] Patent Number: 6,031,223
[45] Date of Patent: Feb. 29, 2000

[54] ROTARY ENCODER HAVING A SENSOR ACTIVATION CONTROLLER

[75] Inventor: Akihiko Morishita, Hiratuka, Japan

[73] Assignee: Nikon Corporation, Tokyo, Japan

[21] Appl. No.: 09/038,055

[22] Filed: Mar. 11, 1998

[30] Foreign Application Priority Data

Mar. 11, 1997 [JP] Japan ..................................... 9-074419

[51] Int. Cl.$^7$ .................................................. G01D 5/34
[52] U.S. Cl. ................................ 250/231.13; 250/231.16
[58] Field of Search ....................... 250/231.13, 231.16, 250/231.18, 237 G; 341/13

[56] References Cited

U.S. PATENT DOCUMENTS 5,665,965  9/1997  Durham, III ....................... 250/231.16

*Primary Examiner*—Que T. Le
*Attorney, Agent, or Firm*—Pillsbury Madison & Sutro LLP

[57] ABSTRACT

A rotary encoder comprising a code plate having an optical pattern, first sensor group A1 through An for detecting the rotational angle of the code plate by detecting the optical pattern, second sensor group B1 through Bn for detecting the rotational angle of the code plate by detecting the optical pattern. Each of the first sensors is associated with one of the second sensor, and the second sensor is positioned 180 degrees opposite to the associated first sensor along the circumference of the code plate. The rotary encoder further comprises a determination unit which determines if the output of the currently processed first or second sensor is in the first state, in which the rotational speed of the code plate relative to the currently processed first or second sensor is greater than a predetermined value, or in the second state, in which the rotational speed of the code plate relative to the currently processed first or second sensor is smaller than or equal to the predetermined value. If it is determined that the output is in one of the first and second states which was defined in advance, a controller activates either the first group sensors or the second group sensors. If it is determined that the output is in the other state, then the controller activates both the first and second group sensors.

6 Claims, 7 Drawing Sheets

ROTARY ENCODER HAVING A SENSOR ACTIVATION CONTROLLER

BACKGROUND OF THE INVENTION

1. Field of the Invention

This invention provides a rotary encoder useful for a high-accuracy angle measuring apparatus, such as a theodolite, and more particularly to a measuring apparatus using the so-called "arctangent" method.

2. Description of Related Art

Known angle detection arrangements using optical rotary encoders include the "incremental" method and the "absolute" method. Rotary encoders using an absolute method are very accurate, but their structures are complicated and therefore measuring systems using this method are expensive. For this reason, incremental type rotary encoders are generally used in an angle measuring apparatus, such as theodolites.

Incremental type rotary encoders are less accurate than absolute type rotary encoders. In order to compensate for the lack of accuracy, an arctangent (or interpolation) method is used.

Using the arctangent method, two sensing devices are fixed relative to a rotary plate (or the code plate) having a bright and dark pattern so that their respective phases are 90 degrees offset from one another. From the outputs of the two sensing devices, the arctangent ($\tan^{-1}$) of the output ratio of the two devices is obtained, from which the rotational angle can be calculated with greater resolution than that of the pattern pitch of the code plate.

However, there is some degree of uncertainty (or measuring error) in the measuring results of the rotary encoder using the arctangent method due to decentering of the code plate. In order to correct the measuring error, a pair of sensors, each comprising two sensing devices, is used, and the outputs (i.e., the arctangent values) of the two sensors are averaged. In this case, the second sensor is positioned 180 degrees from (opposite to) the first sensor along the circumference of the code plate. These two sensors constitute a detection unit. As the number of detection units increases, the measuring accuracy is improved because the uncertainty or the measuring error is compensated.

FIG. 7 is a block diagram of the signal processing associated with a conventional rotary encoder. Sensors A1 and B1, which are positioned 180 degrees from each other (opposite to each other along the circumference of the code plate—not shown), constitute a detection unit 1. A plurality of (i.e., n) detection units are used, and the outputs from the detection units 1 through n are supplied to a signal processor 10. Signal processor 10 provides its output to CPU 20.

As shown in FIG. 8 the conventional signal processor 10 has 2n processing lines for processing the outputs from 2n sensors. Each line comprises an amplifier 11, a square pulse generator 12 connected in parallel with the amplifier 11, and a counter 13 in series with the square pulse generator 12. The output from each sensor is amplified by the associated amplifier 11. At the same time, the output is modified by the square pulse generator 12, and the number of pulses are counted by the counter 13. The CPU 20 performs necessary operations based on the amplified output and the counter value to obtain the rotary angle of the encoder.

Measuring instruments using rotary encoders are generally used outdoors, and have batteries as the power sources. In order to allow outdoor use for a long time, many attempts have been made to reduce the power consumption of each component and to save power as a whole. However, in the conventional rotary encoder, each detection unit consumes a certain amount of electric power, and as the number of detection units is increased for the purpose of improving the measuring accuracy, the total power consumption increases. The design parameters of accuracy and power saving are at odds with each other.

SUMMARY OF THE INVENTION

Therefore, it is an object of the invention to overcome the problems associated with prior art arrangements and reduce the total power consumption of the detection units, while achieving satisfactory measuring accuracy by overcoming errors associated with decentering of the code plate. This can be achieved by activating only one of the sensors that comprise a detection unit.

It is another object of the invention to simplify the structure of the signal processor and reduce the power consumption of the signal processor.

In order to achieve these objects, and according to one aspect of the invention, a rotary encoder is provided, which comprises a code plate having an optical pattern, one or more first sensors for detecting the rotational angle of the code plate by detecting the optical pattern, and one or more second sensors for detecting the rotational angle of the code plate by detecting the optical pattern. Each of the second sensors is associated with one of the first sensors, and is positioned 180 degrees opposite to the associated first sensor. This rotary encoder has a determination unit for determining whether the output of a currently processed sensor is in a first state or a second state. In the first state the rotational speed of the code plate relative to the currently processed first or second sensor exceeds a predetermined value. In the second state, the rotational speed of the code plate relative to the currently processed sensor is smaller than or equal to the predetermined value. If it is determined that the output of the currently processed sensor is in either the first or second state that was defined in advance, a controller activates only one of the first and second sensors. If it is determined that the output of the currently processed sensor is in the other state, then the controller activates both the first and second sensors.

According to another aspect of the invention, the rotary encoder also comprises a code plate having an optical pattern, one or more first sensors for detecting the rotational angle of the code plate by detecting the optical pattern, and one or more second sensors for detecting the rotational angle of the code plate by detecting the optical pattern. As in the arrangement described above, each of the second sensors is associated with one of the first sensors, and is positioned 180 degrees opposite to the associated first sensor. A determination unit is provided, which determines whether the rotational speed of the code plate relative to the currently processed first or second sensor is smaller than a predetermined minimum value, greater than a predetermined maximum value, or in the range between the minimum and the maximum values. If it is determined that the rotational speed of the code plate relative to the currently processed first or second sensor is smaller than the minimum value or greater than the maximum value, a controller activates only one of the first and second sensors. If it is determined that the rotational speed of the code plate relative to the currently processed first or second sensor is in the range between the minimum and the maximum values, then the controller activates both the first and second sensors.

The first sensors are connected to the first signal processing lines, and the second sensors are connected to the second signal processing lines. Each of the first signal lines includes an amplifier for amplifying the output signal from the first sensor, a square pulse generator for converting the output signal into pulse wave, and a counter for counting the number of pulses of the pulse wave. Each of the second signal lines includes an amplifier for amplifying the output signal from the second sensor. In this structure, the second sensors are not activated in the specific cases defined above. If the rotary encoder is designed so that the first sensors are not activated in the specific cases defined above, then each of the first signal lines includes only an amplifier, while each of the second signal lines includes an amplifier, a square pulse generator, and a counter.

The determination unit compares the number of pulses counted by the counter in a predetermined period of time with a prescribed number.

BRIEF DESCRIPTION OF THE DRAWINGS

The above and other objects, features, and advantages of the present invention will be apparent from the detailed description which follows by way of limiting exemplary embodiments of the invention with reference to the attached drawings, which are here described.

DETAILED DESCRIPTION OF THE INVENTION

Figure 1:
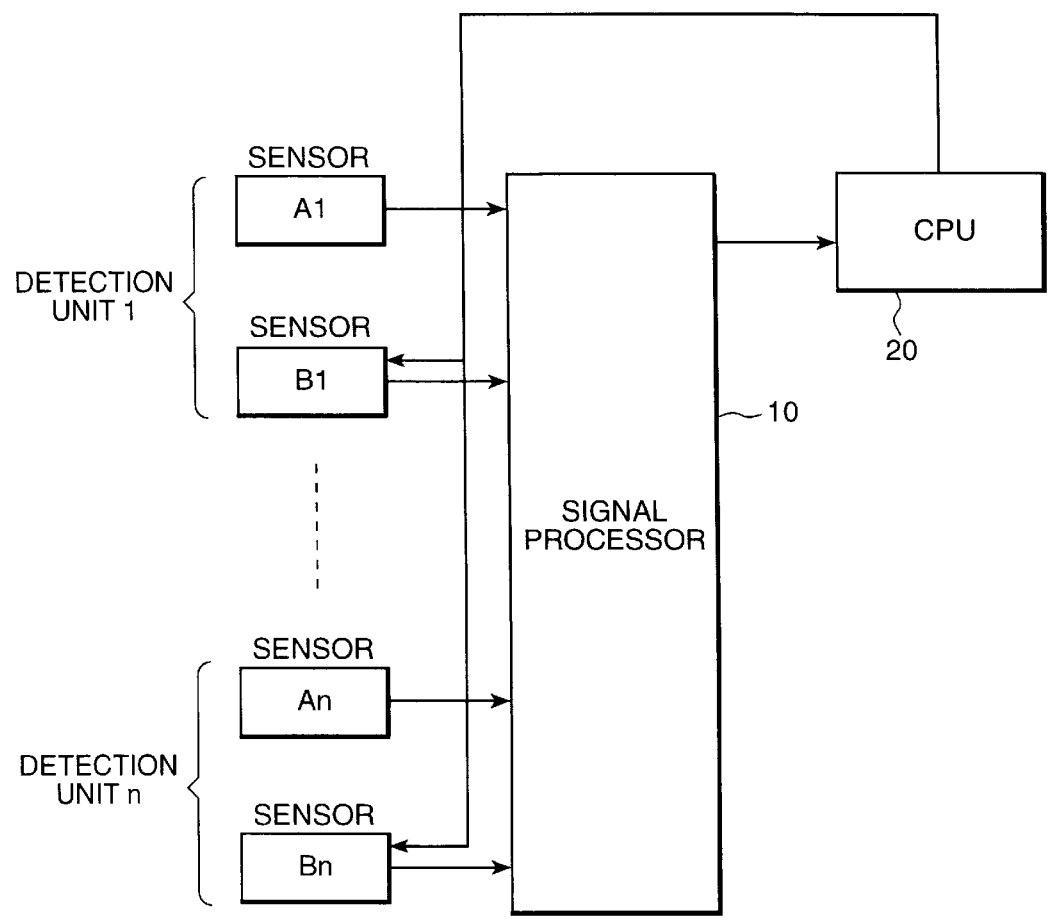
FIG. 1 is a block diagram of the signal processing part of the rotary encoder according to an embodiment of the invention.

FIG. 1 is a block diagram of the signal processing part of the rotary encoder according to an embodiment of the invention. The rotary encoder in this embodiment uses an arctangent method. This rotary encoder has a rotary plate (i.e., a code plate) having an optical bright-and-dark pattern on it. As has been explained earlier, the arctangent method utilizes two sensing devices each of which are fixed relative to the rotary plate, but are positioned such that they are 90 degrees out of phase with respect to each other. These two sensing devices together constitute a sensor. The arctangent ($\tan^{-1}$) of the output ratio of the two sensing devices is obtained to calculate the rotational angle to a greater resolution than that of the pattern pitch of the rotary plate. Since the arctangent method itself is known, the rotary plate and the two sensor devices are not illustrated here.

In this embodiment, n pairs of sensors, that is, sensors A1 through An and sensors B1 through Bn are used. Each sensor comprises two sensing devices positioned so that they are 90 degrees phase shifted with respect to each other. A pair of sensors A1 and B1 together constitute a detection unit 1, as shown in FIG. 1. The sensors A1 and B1 are positioned 180 degrees opposite to each other along the circumference of the rotary plate (not shown). Similarly, the sensors An and Bn are positioned 180 degrees opposite to each other along the circumference of the rotary plate, and comprise a detectioin unit n. For the sake of convenience, sensors A1 through An are referred to as A group sensors, while sensors B1 through Bn are referred to as B group sensors.

The outputs of the detection units 1 through n are supplied to the signal processor 10. These outputs have a sine wave form. When the signal processor 10 receives the sine wave signals from the detection units 1 through n, the signal processor 10 processes these signals so as to allow the rotational angle of the rotary plate to be calculated by the CPU 20.

Figure 2:
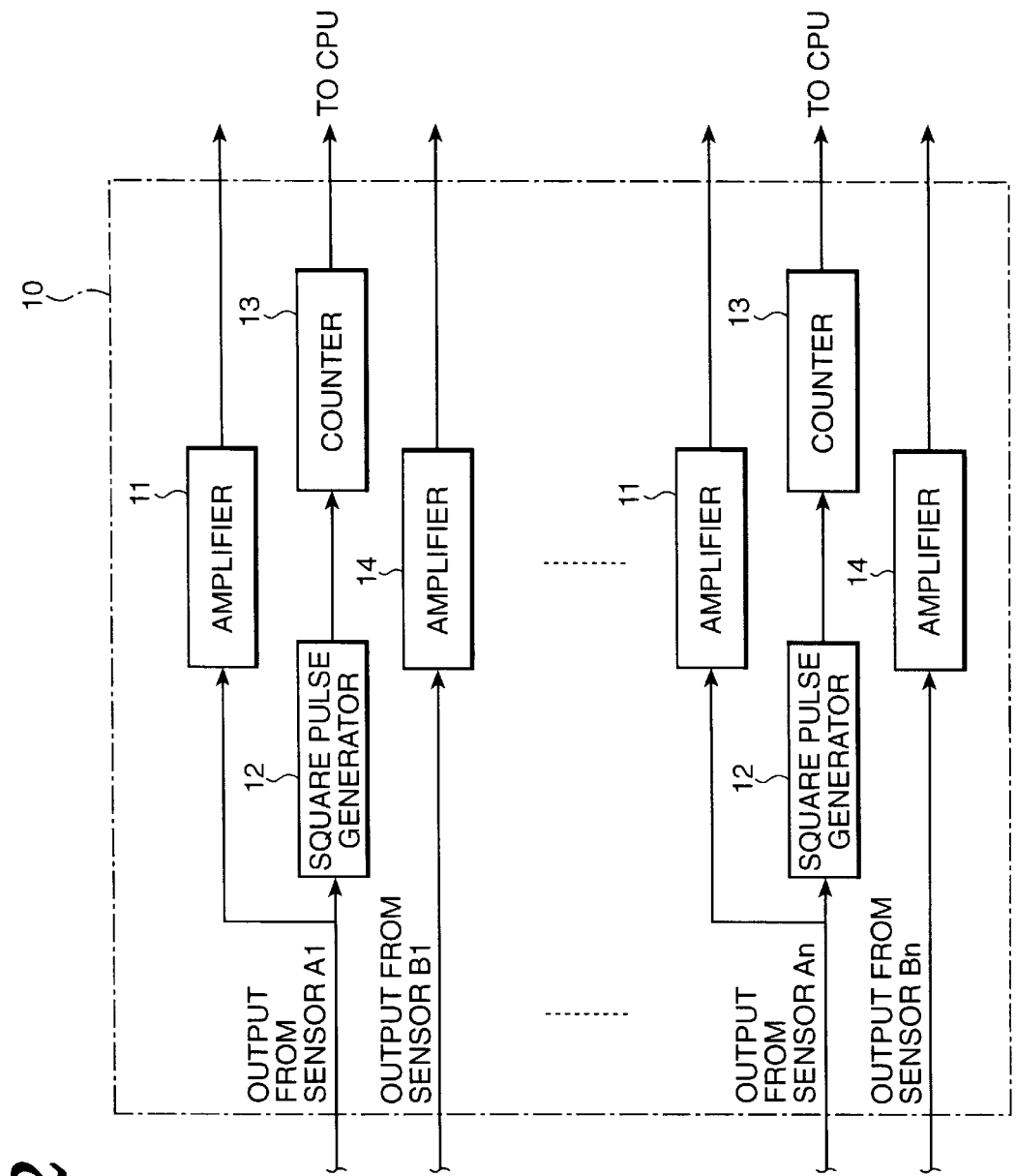
FIG. 2 is a block diagram showing the internal structure of the signal processor shown in FIG. 1.

FIG. 2 is a block diagram showing the internal structure of the signal processor 10. As shown in the drawing, the signal processing lines for the A group sensors (A1 through An) are different from the signal processing lines for the B group sensors (B1 through Bn). The output from each of the A group sensors is supplied to a first processing line which comprises a amplifier 11, a square pulse generator 12 connected in parallel to the amplifier 11, and a counter 13 in series with the square pulse generator 12.

The sine wave signal output from each of the A group sensors (A1 through An) is supplied to both the amplifier 11 and the square pulse generator 12. The amplifier 11 amplifies the sine wave signal, and outputs the amplified signal to the CPU 20. On the other hand, the square pulse generator 12 converts this sine wave signal into pulses, and supplies the pulses to the counter 13. The counter 13 counts the number of pulses supplied from the square pulse generator 12, and outputs the count value to the CPU 20.

Meanwhile, each of the B group sensors is connected to the second processing line which includes only an amplifier 14. Thus, the outputs from the sensors B1 through Bn are amplified by the associated amplifier 14, and the amplified sine signals are supplied to the CPU 20.

The CPU 20 calculates the rotational angle based on the outputs from the signal processor 10. CPU 20 performs ON/OFF control of the B group sensors. More particularly, prior to the calculation of the rotational angle, the CPU suspends the operation of the B group sensors in a specific occasion for the purpose of minimizing the power consumption. The ON/OFF control for the B group sensors will be described in detail below.

Figure 3:
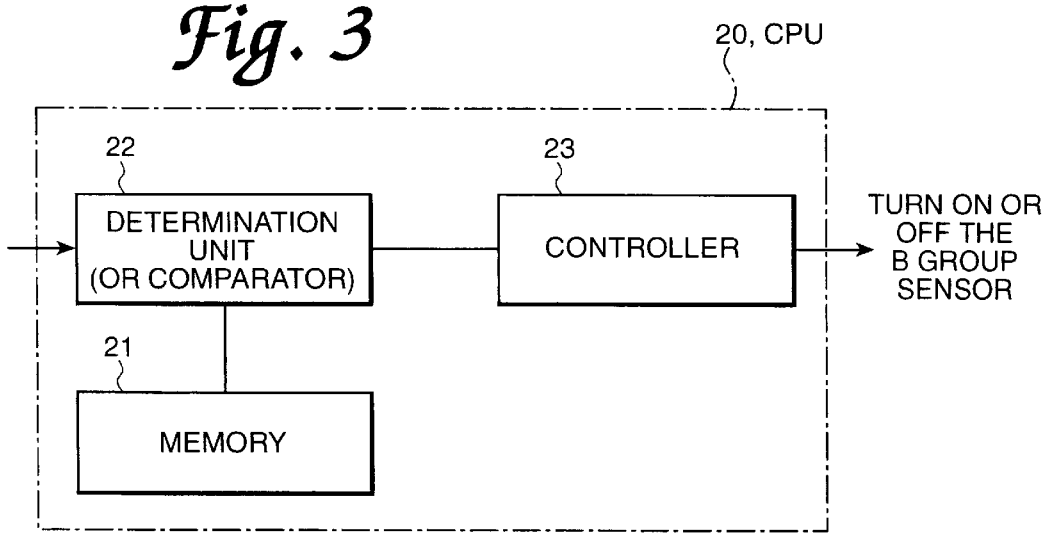
FIG. 3 is a functional block diagram of the CPU which performs ON/OFF control for the B group sensors B1 through Bn.

FIG. 3 is a functional block diagram of the CPU 20 explaining the ON/OFF control for the B group sensors. The memory 21 stores two prescribed values, a minimum and a maximum. The determination unit 22, which can be constituted by a comparator, receives the counter value (which denotes the number of pulses) output from the counter 13, and compares the counter value with the two prescribed values stored in the memory 21. The controller 23 turns on or off the B group sensors based on the comparison result.

The prescribed two values stored in the memory 21 define the minimum and maximum displacements of the rotary plate pattern about the rotational axis per prescribed time. In the conventional arctangent-method rotary encoder, measurement errors due to the decentering of the rotary plate are compensated by averaging the outputs from the two sensors that are positioned 180 degrees opposite to each other along the circumference of the rotary plate. This is efficient to improve the measuring accuracy when the rotary plate is rotating relatively fast.

However, if the rotary plate is rotating very slowly, it can be regarded that the rotational displacements of the rotary plate obtained from the two sensors are substantially equal, and that the output values of the two sensors contain little decentering error. This means that the rotational angle can be detected accurately without using two sensors when the rotational speed of the plate is slow. In other words, it is not necessary to average the outputs from the two sensors to compensate the decentering error at a low rotational speed. To this end, the rotational displacement of the rotary plate pattern per time at a low speed is stored as the minimum value (for example, 1 pulse).

Meanwhile, when a long range is roughly measured, the rotatary plate is rotating very quickly. In this case, it is not necessary to improve the measuring accuracy by averaging the outputs from two sensors to compensate the decentering error. This rotational displacement of the pattern per time at a high rotational speed is stored as the maximum value (for example, 5 pulses).

The rotational displacement of the rotary plate pattern is expressed by the number of pulses, which also represents the speed of the rotary plate relative to each sensor.

Returning to FIG. 3, if the determination unit 22 determines that the counter value output from each of the A group sensors, which represents the rotational displacement of the pattern per time, is smaller than the stored minimum value or greater than the maximum value, then the controller 23 turns off the associated B group sensor because it is not necessary to average the outputs of two sensors in order to improve the measurement accuracy.

Figure 4:
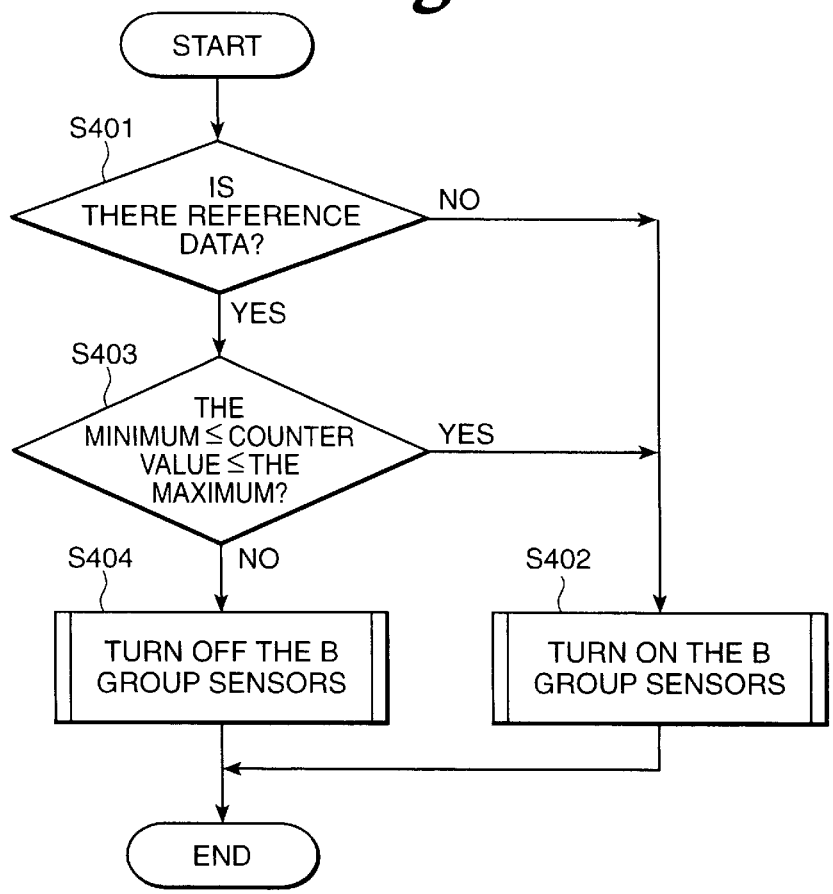
FIG. 4 is a flowchart showing the ON/OFF control operations for the B group sensors B1 through Bn.
Figure 5:
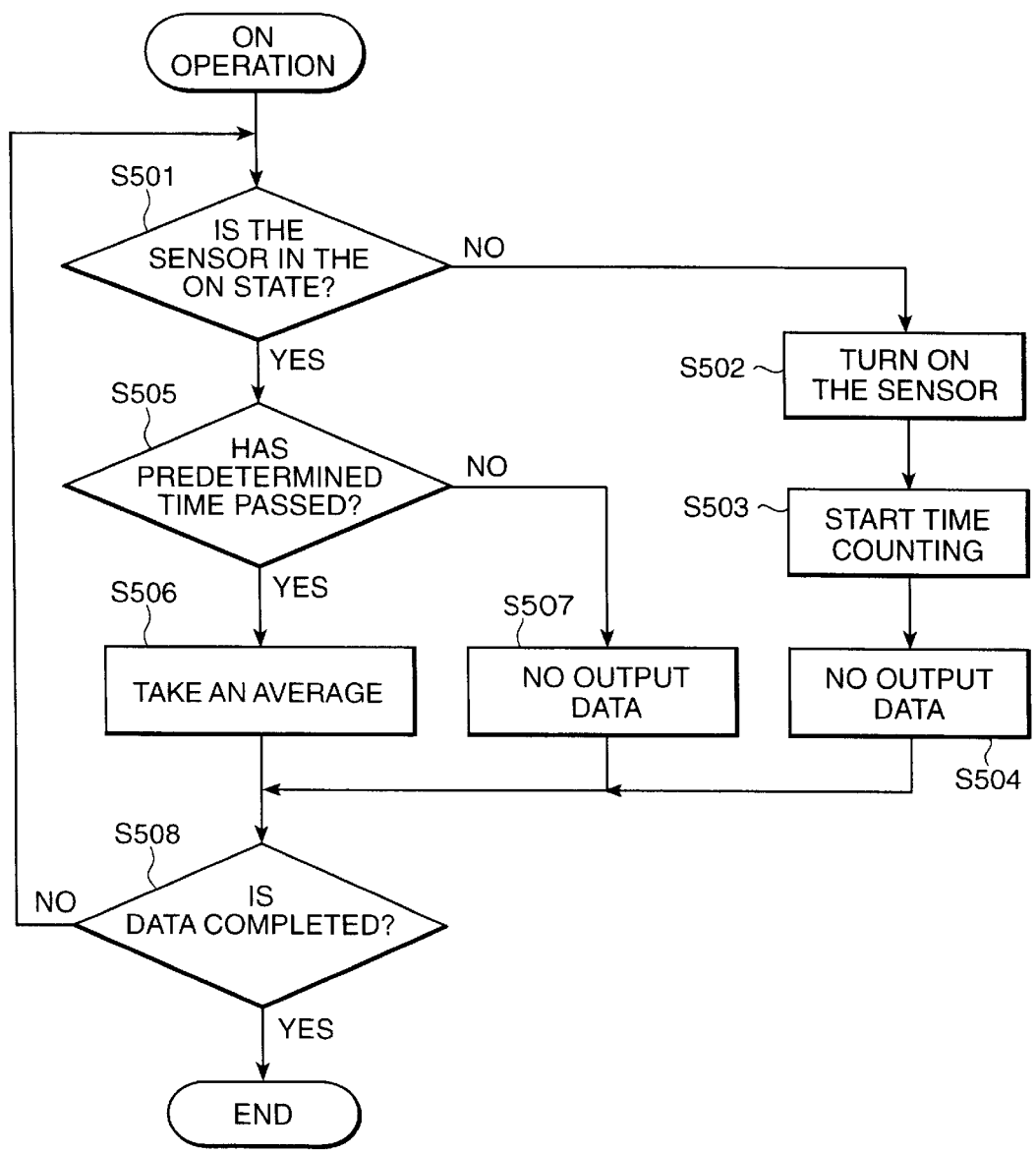
FIG. 5 is a flowchart of the ON operation for the B group sensors shown in FIG. 4.
Figure 6:
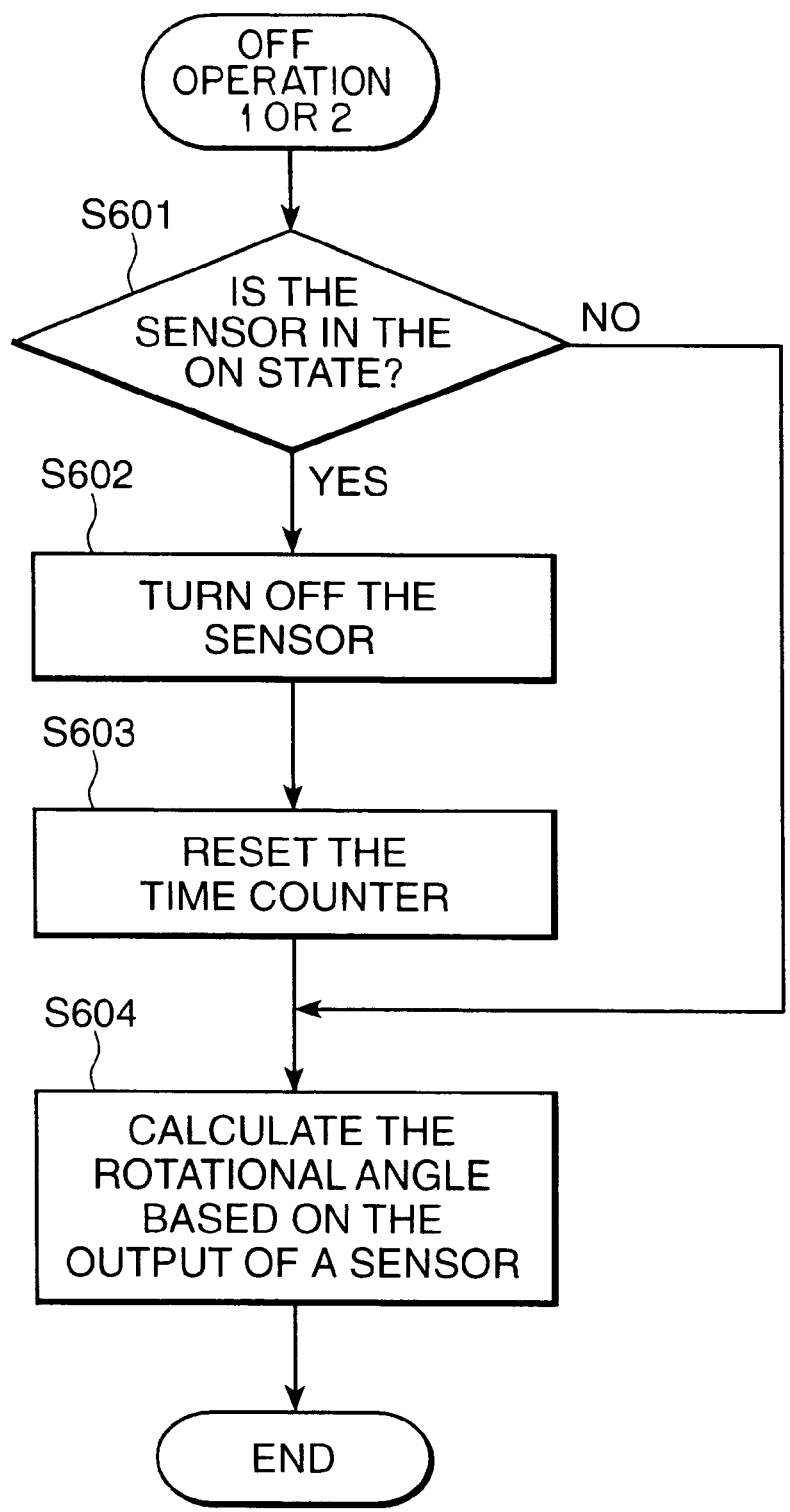
FIG. 6 is a flowchart of the OFF operation for the B group sensors shown in FIG. 4.
Figure 7:
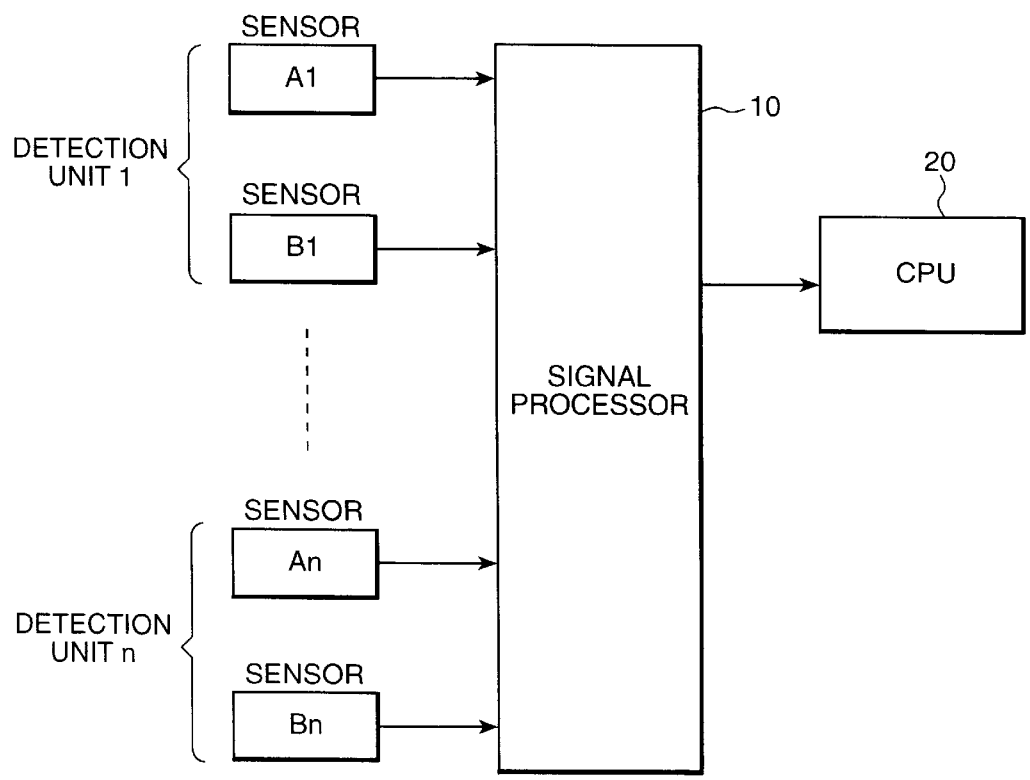
FIG. 7 is a block diagram of the signal processing part of a conventional rotary encoder.
Figure 8:
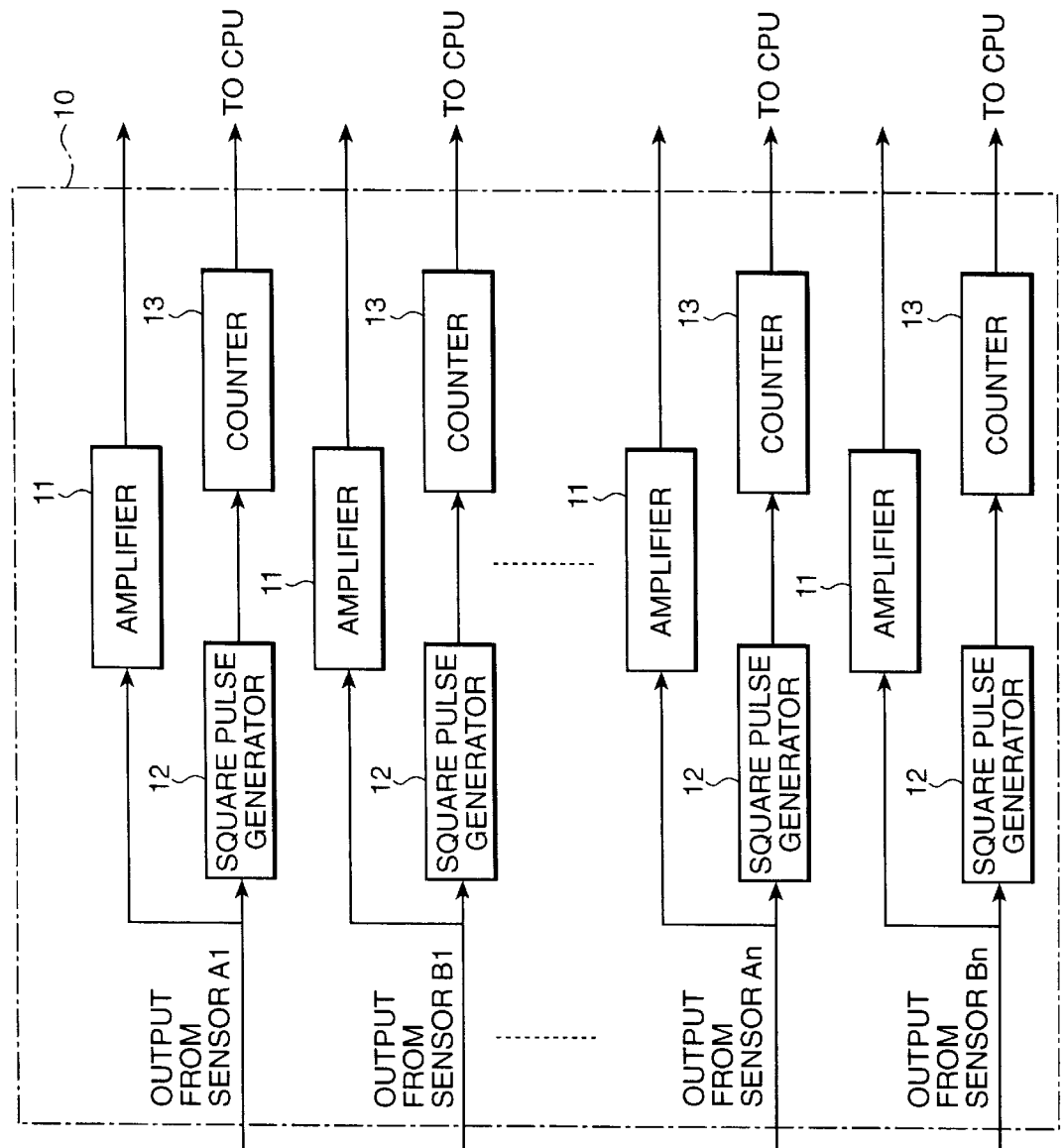
FIG. 8 is a block diagram of the conventional signal processor shown in FIG. 7.

FIGS. 4 through 6 are flowcharts showing the ON/OFF control operations of the controller 23. Beginning with FIG. 4, At step S401 it is determined whether reference data exists, that is, if the initial position data of the last turning-on operation exists. If there is no reference data, the associated B group sensor is turned on in step S402. This ON operation will be described in detail below.

If there is reference data, the process proceeds to step S403, in which the number of pulses counted by the counter 13 is compared with the prescribed minimum and maximum values. The counter value represents the displacement of the rotary plate pattern per time detected by the sensor being processed.

If the counter value is smaller than the minimum value, the rotary plate is rotating slowly, and it is not necessary to average the outputs of two sensors because there is little decentering error contained. If the counter value is greater than the maximum value, the rotary plate is rotating very quickly, and it is not necessary to compensate the decentering error because a rough measurement of a long range is performed. In these cases, the process proceeds to step S404 to turn off the associated B group sensor because it is not necessary to activate both the A and B sensors.

If the counter value lies in the range between the minimum and maximum values, it is regarded that the rotary plate is rotating at a moderate speed. In this case, decentering error exists in the output of the sensor, but accurate measurement is required. In order to correct the decentering error, the process returns to step S402 to turn on the associated B group sensor.

FIG. 5 shows the detailed process of the ON operation for the B group sensors shown in step S402 of FIG. 4.

First, at step S501 it is checked whether or not the currently processed B group sensor is in the ON state. If the sensor is in the OFF state, then that B group sensor is turned on in step S502. However, the signal from this B group sensor is unstable immediately after the turning on, and is not suitable to output data. Accordingly, the CPU starts time-counting in step S503 in order to acquire effective data after a predetermined period of time and convert it into the position. During the time counting, there is no output data as shown in step S504. The process proceeds to step S508, in which it is determined if the data is completed. Since, in this case, data is not completed, the process returns to step S501.

In step S501, it is again checked if the currently processed B sensor is in the ON state. This time, the sensor is in the ON state and, accordingly, the process proceeds to step S505, in which it is determined if a predetermined period of time has passed since the B sensor was turned on. If a predetermined time has passed, the output from this B sensor is acquired, and the average angle of the rotary plate is calculated based on the outputs from the currently processed A and B sensors in step S506. If the output from the sensor A1 is a1 and if the output from the sensor B1 is b1, then the calculation result is (a1+b1)/2 in this embodiment. In this way, complete data is obtained in step S508. If, in step S505, predetermined time has not passed yet, no data is acquired (step S507) and the process returns to step S501 via step S508. The operation is repeated until a predetermined time has passed.

FIG. 6 shows the detailed process of the OFF operation for the B group sensors shown in step S404 of FIG. 4. First, at step S601 it is checked whether or not the currently processed B sensor is in the ON state. If this B sensor is in the OFF state, the process jumps to step S604, in which the rotational angle is calculated based on the output from the associated A sensor. For example, if the B sensor had an output value b1 in the last operation, while the output value of the A sensor in the last operation is a1, and if the output value of the A sensor changes to a1' in the current operation, then the current output value b1' of the B sensor is calculated as b1'=b1+(a1'-a1). Using this b1' value, the average (a1'+b1')/2 is further calculated.

If the currently processed B sensor is in the ON state in step S601, this B sensor is turned OFF in step S602. In step S603, the time counter which was used in steps S503 and S505 in order to ensure the stable output of the B sensor is reset. Then, in step S604, the rotational angle is calculated based on the output of the A sensor. In this way, source voltage supply to the B group sensors is suspended until accurate measurement is required.

Although the invention has been described based on an embodiment, the invention is not limited to this embodiment. There are many other modifications within the spirit and the scope of the invention.

For example, in the embodiment, the B group sensors are turned off when the counter value supplied from the associated A sensors are smaller than the prescribed minimum value or greater than the maximum value. However, either the minimum or the maximum value may be stored in the memory. If only the minimum value is stored, the B sensor is turned off when the counter value is smaller than this minimum value. If only the maximum value is stored, the B sensor is turned off when the counter value is greater than the maximum. In addition, the counter values may be obtained from the B group sensors, and the A group sensors may be turned off when the counter values are smaller than or greater than the prescribed values.

Because the counter value, which represents the rotational speed of the rotary plate relative to the sensor, is compared with a prescribed value to determine whether or not accurate measurement is required, and because one of the sensor pairs is turned off when it is determined that accurate measurement is not required, the power consumption in the detection units is reduced as a whole.

Two prescribed values, namely, the minimum and the maximum values may be stored in the memory. In this case, both the A sensor and the B sensor are activated only when the counter value (i.e., the rotational speed of the rotary plate) is within the range between the minimum and the maximum values. If the rotational speed of the rotary plate is smaller than the minimum value or greater than the maximum value, then one of the sensor pairs is turned off. Thus, power supply is suspended when compensation for decentering error is not required. Consequently, the power consumption of the sensor can be reduced.

Since, among the two signal lines for a pair of sensors, only one signal processing line requires a counter and a square pulse generator and the other line does not, the system can be simplified as a whole, and power consumption of the signal processing part can be reduced.

Because the number of pulses counted by the counter is used for the comparison, the determination unit can compare this pulse number with the prescribed number stored in the memory, and the determination process can be simplified.

What is claimed is:

1. A rotary encoder, comprising:

a code plate having an optical pattern thereon;

one or more first sensors for detecting the rotational angle of the code plate by detecting the optical pattern;

one or more second sensors for detecting the rotational angle of the code plate by detecting the optical pattern, each of the second sensors being associated with one of the first sensors and being positioned 180 degrees about the code plate (opposite to) its associated first sensor;

a determination unit for determining whether an output of a currently processed sensor is in a first state, in which the rotational speed of the code plate relative to the currently processed first or second sensor exceeds a predetermined value, or in a second state, in which the rotational speed of the code plate relative to said currently processed sensor is smaller than the predetermined value or in other state in which the rotational speed of the code plate relative to said currently processed sensor is equal to the predetermined value; and a controller for activating only one of the first and second sensors when it is determined that the output of the currently processed sensor is in either first or second state, and for activating both the first and second sensors when it is determined that the output of the currently processed sensor is in the other state.

2. A rotary encoder according to claim 1, wherein one of the first and second sensors is connected to the first signal processing line which includes an amplifier for amplifying the output signal from said first or second sensor, a square pulse generator for converting the output signal into a pulse wave, and a counter for counting the number of pulses of the pulse wave, and the other sensor is connected to the second signal processing line which includes an amplifier for amplifying the output signal from the other sensor.

3. The rotary encoder according to claim 2, wherein the determination unit receives a counter value which is the number of pulses counted by the counter in a predetermined period of time, and compares the counter value with a prescribed number.

4. A rotary encoder, comprising:

a code plate having an optical pattern;

one or more first sensors for detecting the rotational angle of the code plate by detecting the optical pattern;

one or more second sensors for detecting the rotational angle of the code plate by detecting the optical pattern, each of the second sensors being associated with one of the first sensors and being positioned 180 degrees opposite to the associated first sensor;

a determination unit for determining whether the rotational speed of the code plate relative to the currently processed first or second sensor is smaller than a predetermined minimum value, greater than a predetermined maximum value, or in the range between the minimum and the maximum values; and a controller for activating only one of the first and second sensors when it is determined that the rotational speed of the code plate relative to the currently processed first or second sensor is smaller than the minimum value or greater than the maximum value, and for activating both the first and second sensors when it is determined that the rotational speed of the code plate relative to the currently processed first or second sensor is in the range between the minimum and the maximum values.

5. A rotary encoder according to claim 4, wherein one of the first and second sensors is connected to the first signal processing line which includes an amplifier for amplifying the output signal from said first or second sensor, a square pulse generator for converting the output signal into a pulse wave, and a counter for counting the number of pulses of the pulse wave, and the other sensor is connected to the second signal processing line which includes an amplifier for amplifying the output signal from the other sensor.

6. The rotary encoder according to claim 5, wherein the determination unit receives a counter value which is the number of pulses counted by the counter in a predetermined period of time, and compares the counter value with a prescribed number.

* * * * *